2,896,375
CHEMICAL METHOD OF BARK REMOVAL IN FORESTRY BY USING BOROARSENATES

John W. Ryznar, La Grange, Ill., assignor to National Aluminate Corporation, Chicago, Ill., a corporation of Delaware No Drawing. Application December 16, 1957
Serial No. 702,792

15 Claims. (Cl. 47—57.5)

This invention relates to a method of debarking trees by chemical means in the practice of forestry. More particularly, this invention relates to an improved chemical method of destroying the cambium layer of growing trees by exposing this layer of growth origin to lethal concentrations of water-soluble boroarsenate salts.

Heretofore the value of chemical debarking has been established in the work of White as disclosed in U.S. 2,324,968, wherein a variety of chemical compounds were suggested as useful for the purpose of killing the cambium layer and causing a more ready separation of the bark from the tree. The chemical compounds suggested as potentially useful by White are calcium chloride, sodium chlorate, formaldehyde, ammonium bifluoride, copper sulphate, copper nitrate, zinc chloride, and sodium arsenite.

Publication of the results of considerable research since the time of White has indicated that the alkali and ammonium salts, and particularly sodium arsenite, are the only practical compounds yet found to promote separation of the bark, or phloem, from the xylem, or wood, of trees. The usual herbicides are not equivalent nor practicable for this use. Extensive field testing of sodium monochloroacetate, ammonium sulfamate, esters and salts of 2,4-dichlorophenoxyacetic acid and 2,4,5-trichlorophenoxyacetic acid and related compounds known to be active herbicides are not satisfactory in debarking timber.

In forestry studies now under way and some of which have been completed, it has been found that water-soluble boroarsenates, particularly ammonia and the alkali metal boroarsenates, are useful for the purpose of chemical debarking of forestry trees and have particular advantages over the chemicals heretofore suggested for this purpose. For example, in order to use sodium arsenite, as suggested in the prior art, it is necessary to provide a strongly alkaline environment to produce stable aqueous solutions. One pound per gallon of caustic soda has been indicated as essential to provide the necessary solubility. The resulting aqueous solution has a very high pH. Because of the high alkalinity of aqueous solutions of sodium arsenite and the resultant destruction and corrosion, galvanized containers and equipment commonly available for storage and transportation can not be used. In the presence of active metals such as zinc, arsine gas is liberated from sodium arsenite solutions which adds to the hazards of personnel in working with solutions of this nature.

Another objection to sodium arsenite is its destructive action upon the bristles of brushes used in the application of the same to girdled areas of trees. Bristles are rapidly deteriorated by aqueous sodium arsenite solutions, as has been established in practical forestry tests.

A still further disadvantage of sodium arsenite due to its high alkalinity appears in an analysis of the efficiency of the applied chemical solutions in bark separation with respect to the adhesion of the bark to the wood in treated trees as the distance away from the girdle and point of chemical application is increased. At high caustic contents the adhesion of the bark is less affected with increased distances above the girdle point. It has been observed in chemical debarking that the water-soluble boroarsenate salts tend to have less timber areas requiring special attention. The need to resort to use of physical debarking means in order to clear the wood surface of the tree of unwanted cortex is materially decreased. While it has not yet been established, it is believed the slightly alkaline condition of the boroarsenate salt solutions (the pH of the sodium salt in aqueous solution is 7.9) allows more effective entry of the chemical solution into the cells of the cambium layer, into the sapwood and subsequently into the vascular system of the tree, there to be carried throughout the cambium layer. These and other practical advantages have been observed thus far in the use of water-soluble boroarsenate salts in comparative tests with chemicals suggested in the prior art.

One object of this invention is to provide a readily water-soluble chemical agent which may be used in standardly available containers without deteriorating the same, which compound will cause deterioration of adhesion uniformly between the xylem and the cortex or the woody portion of the tree and its bark.

Another object of the invention is to provide a chemical composition stable at high concentrations or in a solid form which may be readily diluted with water to form highly concentrated solutions without crystallization or precipitation when exposed to temperatures as low as 10° F. and which is readily absorbed by the cambium and sapwood of trees to promote a separation between the xylem, or wood, and the bark, or cortex, of the trees.

Forestry tests indicate practical success in the use of water-soluble boroarsenates in promoting chemical debarking of red oak, American elm, hemlock, aspen, poplar, beech, maple, birch and conifers. Pine, white birch and white ash give some indication that they are not so readily killed as others in the comparative tests. It is usual that trees may be harvested within about four months following the application of the boroarsenate solution, although indication of poisoning and ultimate death of the tree is indicated within days after girdling and application. Preferred practice is to so plan the harvesting of the wood crop that it stands through the winter season following chemical debarking treatment near the spring of the year. Alternate freezing and thawing, plus the action of the wind, are strong, natural assistants in freeing the bark from tree crops before harvesting.

The time of application is advantageously confined to the very early spring and early summer season. Initial test results indicate that application of the boroarsenate solution to intimate contact with the cambium layer can advantageously precede the period of sap-peeling. "Sap-peeling" is a term used in the art to refer to peeling the bark from a tree during a period when the bark is most easily removed under shearing stresses. Sap-peeling can be related to a period of increased activity of the vascular cambium and precedes this activity by a matter of some weeks, depending upon the average mean temperature, the latitude, the variety of trees, and other known variables. The length of the sap-peeling period also varies considerably and could be roughly stated to vary from about 40 to 100 days depending upon the species of tree. Sap-peeling periods for a given species in a given area are quite consistent from year to year. Thus planning can be provided in the use of chemical debarking means in forestry practice.

Application of the chemical debarking solution after active development of the cortex, or bark, of the tree has begun is less efficient and as the season goes on becomes less and less practical as evidenced by observed debarking inefficiency.

Concentrations of the boroarsenate salt in aqueous solution have been varied from 5% to about 50% by weight and found effective throughout this range of concentration to produce the essential lethal result. Tests now under way, but not yet completed, have been designed to establish the optimum economic concentration of the active component.

In the formulation of the boroarsenate solution, it has been found desirable to include animal repellants, illustratively, cresylic acid, crude pyridine and the water-soluble salts of chlorinated phenols. It additionally has been found desirable and valuable to include in the aqueous solution of the boroarsenate for chemical debarking purposes either a dyestuff or a pigment of strong contrasting color to the browns and greens normally found in a woodlot. Dyestuffs and tracer pigments facilitate observation of treated trees as well as indicate any unintended spillage or careless usage of the toxic material. It is advantageous from the standpoint of application to include in the aqueous formulation thickening agents, illustratively, bentonite clay, water-soluble alkyl cellulose ethers such as hydroxyethyl cellulose, methyl cellulose, sodium polyacrylate, sodium cellulose glycolate, etc., to increase the viscosity of the aqueous material, to avoid thereby unnecessary dripping and splashing and to assist in brush or roller application to the girdled area of trees. Tests indicate that some care must be exercised in the selection of viscosity modifiers as in some instances efficiency of debarking has been adversely affected through their use.

A practical formulation has been prepared containing 25% of active component by heating to a boil 35 parts by weight of arsenic oxide, 37½ parts by weight of borax, 3 parts by weight of chelating agent, 0.3 part of Rhodamine "B" (a dyestuff) and 216 parts of water. A clear solution will result. It is preferable to withhold the Rhodamine "B" until after the reaction of the arsenic trioxide and borax. Due care should be exercised in the preparation of all arsenical solutions. If spilled on the skin dermatitis often results unless the contacted areas are washed and rinsed promptly.

While the sodium salt as described above is most practical to produce, compounds useful for the purposes of this invention comprise chemical combinations of arsenous oxide and a borate in a molar ratio yielding an equivalent of one arsenic atom to one boron atom in the compounds. If sodium tetraborate is employed, the ratio between arsenous oxide and tetraborate is 2:1. The borate reactant is preferably sodium or ammonium as the named borates are relatively inexpensive and the boroarsenates made from these new materials quite soluble in water. The boroarsenates of this invention may be generally described by the structural formula

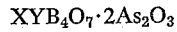

$$XYB_4O_7 \cdot 2As_2O_3$$

wherein X and Y are selected from the group consisting of ammonia and the alkali metals. X and Y may be the same or different members of this group.

Water-soluble boroarsenates may also be produced from aqueous solutions by dissolving arsenous oxide in sodium, potassium or ammonium hydroxide in equimolar ratios. Boric acid is thereafter added in such quantity that the ratio of arsenous oxide to boric acid is of the order of one mol to two mols.

Example I

A series of solutions were prepared containing 5%, 10%, 25% and 40% of sodium boroarsenate by reacting borax and $As_2O_3$ in aqueous solution by boiling. Each of these solutions contained Rhodamine "B" dyestuff to facilitate visual inspection during and after application. A series of wood plots were laid out containing at least five representative species of trees native to the area and included red oak, American elm, hemlock, aspen, poplar, beech, maple, white birch, white ash, fir, and pine. The selected trees in the plot were identified with markers. Each of the test solutions was applied to different ones of the selected trees of each species in the plot. A 25% concentration of sodium arsenite in an aqueous paste was also applied to comparative species of trees for purposes of evaluation and control. The trees were girdled and the freshly cut areas treated with the test solutions by application thereto with a brush. Application in the area was made during the period starting at the beginning of May and completed just before the middle of June. The girdled strips averaged from 6 to 8 inches in width. Examination of the trees after ten days revealed definite toxic effect and fatal symptoms in the appearance of the leaves. At the end of four months all trees in all plots treated showed definite kill. Concentrations of from 5% to 40% of water-soluble boroarsenate salts appeared equally effective at the end of the test period. Except for poplar, the hard woods took longer to die than the soft woods. White ash, pine and white birch appeared to be the most difficult or resistant of the species of trees subjected to chemical debarking tests.

Example II

A similar test plot to that described above was set out and marked and the same representative test solutions were applied after the end of the sap-peeling period and during the very early stages of cortex, or bark, growth. Comparing the results of the application of the test solutions of Example II with the results obtained in Example I, it was noted that all compounds were less effective when applied after the end of the sap-peeling period. Because of the general lack of viscosity of the test solutions, comparative samples were also prepared using minor quantities, e.g., less than 5% of a variety of aqueous jelling agents including bentonite clay, high viscosity methyl cellulose, water-soluble ethyl cellulose, sodium polyacrylate, etc., to overcome splashing and unwanted distribution of the toxicant during initial handling, transportation and application at the point of use. Definite information is not yet available as a result of these tests to determine for a certainty whether the jelling agent interferes with the efficiency of the chemical debarking process. Addition of such agents along with highly colored pigments or dyestuffs is a distinct advantage in the practical aspects of chemical debarking.

In the preparation of concentrates for use in the chemical debarking of trees, additives other than the toxicant are extremely helpful, some of which have been previously mentioned including pigments and dyes as tracers; colloidal materials which materially increase the viscosity of aqueous solutions often referred to as thickeners; dispersing agents, illustratively, the sodium salt of formaldehyde-naphthalene sulfonic acid condensations; surface active agents which aid wetting and spreading including the anionic and non-ionic classes, for example, the sodium salts of alkyl aryl sulfonates and the sodium salts of sulfosuccinic acid esters of oil soluble alcohols, the best known example of which is the sodium salt of dioctyl sulfosuccinic acid. Additionally, chelating agents may be incorporated in the basic formula, or be added to the water used in diluting the concentrates to tie up latent reactivity of ions forming impurities in waters varying widely depending upon the nature of the water source. Among the chelating agents useful are the coordinate compounds of ethylene diamine. Other chelating agents may also be used to remove other unwanted water impurity from reactive proximity to the active toxicant.

The invention is hereby claimed as follows:

1. In forestry practice, the chemical method of debarking trees which comprises applying a lethal concentration of a water-soluble boroarsenate salt about the periphery of the trees, said salt at least in contact with the cambium layer of the tree subsequent to the Winter season but applied thereto not later than during the sap-peeling season.

2. In forestry practice, the chemical method of debarking trees which comprises applying about the periphery of the trees a lethal concentration of a water-soluble boroarsenate salt of the general structure $$XYB_4O_7 \cdot 2As_2O_3$$

wherein X and Y are selected from the group consisting of ammonia and the alkali metals, said salt at least in contact with the cambium layer of the tree subsequent to the Winter season but applied thereto not later than during the sap-peeling season.

3. The same as in claim 2, wherein the alkali metal is sodium.

4. The same as in claim 2, wherein the alkali metal is potassium.

5. The same as in claim 2, wherein X and Y are ammonium ions.

6. In forestry practice, the chemical method of debarking trees which comprises girdling the tree during the period not before the end of the Winter season but before appreciable growth in the phloem, or cortex, and applying to the freshly exposed surface area of the tree a lethal concentration of a water-soluble boroarsenate salt.

7. In forestry practice, the chemical method of debarking trees which comprises girdling the tree subsequent to the Winter season but not later than during the sap-peeling season and applying to the freshly exposed surface area of the tree a lethal concentration of a water-soluble boroarsenate salt of the general structure $$XYB_4O_7 \cdot 2As_2O_3$$

wherein X and Y are selected from the group consisting of ammonia and the alkali metals.

8. The same as in claim 7, wherein the alkali metal is sodium.

9. The same as in claim 7, wherein the alkali metal is potassium.

10. The same as claim 7, wherein X and Y are ammonium ions.

11. In forestry practice, the chemical method of debarking trees which comprises girdling the tree subsequent to the Winter season but not later than during the sap-peeling season, applying to the circumferential area freshly exposed an aqueous solution comprising from 5% to about 50% of a boroarsenate salt.

12. In forestry practice, the chemical method of debarking trees which comprises girdling the tree subsequent to the Winter season but not later than during the sap-peeling season, applying to the circumferential area thus exposed an aqueous solution comprising from 5% to about 50% of a boroarsenate salt of the general structure $$XYB_4O_7 \cdot 2As_2O_3$$

wherein X and Y are selected from the group consisting of ammonia and the alkali metals.

13. The same as in claim 12, wherein the alkali metal is sodium.

14. The same as in claim 12, wherein the alkali metal is potassium.

15. The same as claim 12, wherein X and Y are ammonium ions.

References Cited in the file of this patent

UNITED STATES PATENTS 2,389,870    Reevely _____ Nov. 27, 1945

OTHER REFERENCES

Chemical Abstracts, vol. 46, published 1952, column 8801, article, "Poisoning Certain Undesirable Southern Hardwoods . . . ."

McIntosh: "Effects of Chemical Treatment of Pulpwood Trees," published August 1953 in TAPPI (magazine), vol. 36, No. 8, pages 150A through 160A.